(12) United States Patent
Heseding et al.

(10) Patent No.: US 12,043,141 B2
(45) Date of Patent: Jul. 23, 2024

(54) SYSTEM FOR AN ELECTRICALLY DRIVEN VEHICLE, AND VEHICLE THEREWITH AND METHOD THEREFOR

(71) Applicant: WABCO GMBH, Hannover (DE)

(72) Inventors: Johannes Heseding, Hannover (DE); Gerd Schuenemann, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 792 days.

(21) Appl. No.: 17/055,147

(22) PCT Filed: May 13, 2019

(86) PCT No.: PCT/EP2019/062125
§ 371 (c)(1),
(2) Date: Nov. 13, 2020

(87) PCT Pub. No.: WO2019/219555
PCT Pub. Date: Nov. 21, 2019

(65) Prior Publication Data
US 2021/0146780 A1 May 20, 2021

(30) Foreign Application Priority Data
May 15, 2018 (DE) ...................... 10 2018 111 681.0

(51) Int. Cl.
*B60L 7/10* (2006.01)
*B60L 15/20* (2006.01)
*B60L 53/55* (2019.01)
*B60L 58/12* (2019.01)

(52) U.S. Cl.
CPC ............. *B60L 7/10* (2013.01); *B60L 15/2045* (2013.01); *B60L 53/55* (2019.02); *B60L 58/12* (2019.02)

(58) Field of Classification Search
CPC .. B60L 7/10; B60L 53/55; B60L 58/12; B60L 15/2045
See application file for complete search history.

(56) References Cited

U.S. PATENT DOCUMENTS

| 8,946,926 | B2 | 2/2015 | Eger |
| 9,102,314 | B2 | 8/2015 | Mueller et al. |
| 10,293,702 | B2 * | 5/2019 | Tu ........................... B60L 50/20 |

(Continued)

FOREIGN PATENT DOCUMENTS

| CN | 101771290 A | 7/2010 |
| CN | 201712722 U | 1/2011 |

(Continued)

OTHER PUBLICATIONS

Mechanical translation of JP-H0530608, May 1993.*

*Primary Examiner* — John D Walters
(74) *Attorney, Agent, or Firm* — LEYDIG, VOIT & MAYER, LTD.

(57) ABSTRACT

A system for an electrically-driven vehicle includes at least one first energy store, which is of an accumulator type, and at least one second energy store, of a type which differs from an accumulator type. The second energy store has an energy density lower than an energy density of the first energy store, and has a power density higher than a power density of the first energy store. The first energy store and the second energy store are designed to supply electrical energy for an electric drive of the vehicle.

14 Claims, 3 Drawing Sheets

(56) References Cited

U.S. PATENT DOCUMENTS

| | | | |
|---|---|---|---|
| 11,482,878 B2 * | 10/2022 | Lynds | H02J 7/0034 |
| 2004/0140139 A1 | 7/2004 | Malik | |
| 2010/0133025 A1 | 6/2010 | Flett | |
| 2011/0309675 A1 * | 12/2011 | Eger | B60L 50/16 |
| | | | 307/10.6 |
| 2012/0038318 A1 * | 2/2012 | Mueller | B60L 58/20 |
| | | | 320/109 |
| 2012/0235473 A1 | 9/2012 | Jiang et al. | |
| 2014/0368041 A1 | 12/2014 | Tu et al. | |
| 2015/0344081 A1 | 12/2015 | Kor et al. | |
| 2016/0039306 A1 | 2/2016 | Okamura | |
| 2017/0174098 A1 * | 6/2017 | Zhou | B60L 50/40 |
| 2017/0302094 A1 | 10/2017 | Lynds | |
| 2018/0086330 A1 | 3/2018 | Ito | |

FOREIGN PATENT DOCUMENTS

| | | |
|---|---|---|
| CN | 103171452 A | 6/2013 |
| DE | 102009000222 A1 | 7/2010 |
| DE | 102010017417 A1 | 12/2011 |
| DE | 102014208999 A1 | 11/2015 |
| DE | 112014001595 T5 | 1/2016 |
| EP | 1424494 A1 | 6/2004 |
| EP | 2738036 A2 | 6/2014 |
| GB | 2470478 A | 11/2010 |
| JP | H0530608 A | 2/1993 |
| JP | H0530608 A * | 5/1993 |

* cited by examiner

SYSTEM FOR AN ELECTRICALLY DRIVEN VEHICLE, AND VEHICLE THEREWITH AND METHOD THEREFOR

CROSS REFERENCE TO RELATED APPLICATIONS

This application is a U.S. National Phase Application under 35 U.S.C. § 371 of International Application No. PCT/EP2019/062125, filed on May 13, 2019, and claims benefit to German Patent Application No. DE 10 2018 111 681.0, filed on May 15, 2018. The International Application was published in German on Nov. 21, 2019, as WO 2019/219555 A1 under PCT Article 21(2).

FIELD

The present disclosure relates to the field of vehicles having an electric or hybrid drive. In particular, vehicles of this type are utility vehicles, such as heavy goods vehicles, or trailer vehicles, preferably for utility vehicles. The term "hybrid vehicle" here describes a vehicle which firstly incorporates an electric drive having one or more electric motors, and secondly incorporates a drive having a combustion engine.

BACKGROUND

According to the general concept of these vehicles, the kinetic and potential energy which is stored in the mass of the vehicle, in the event of a slow-down, i.e. upon braking, or in the event of downhill travel, is converted by one or more electric motors of the electric drive, operating in generator mode, into electrical energy and stored in an energy store. The energy thus recovered can then be employed for acceleration, in an exclusively electrically-driven vehicle, or for the support of combustion engines in a hybrid vehicle, in the event of acceleration or uphill travel, for the propulsion of the electric motor(s) of the electric drive. It is moreover possible for other electrical loads in the vehicle to be supplied by the energy store. Particularly in the case of a hybrid vehicle, this reduces the loading of the combustion engine, and fuel consumption is reduced accordingly.

A distinguishing characteristic between exclusively electrically-driven vehicles and hybrid vehicles is that hybrid vehicles require a comparatively smaller energy storage capacity, on the grounds that, during actual travel, periods in which energy can be recovered are generally limited, and regularly follow phases in which energy can be rapidly released back to the drive system.

For the storage of energy, accumulators are customarily employed, which store electrical energy by an electrochemical principle. The technology employed in these accumulators is associated with limitations of their maximum potential charging capacity. However, a maximum potential charging capacity is also dependent upon the energy storage capacity of the accumulator employed. In general, the power which can be delivered by an accumulator is significantly greater than the power at which it can be charged. Moreover, any power recovered during braking or downhill travel, particularly in the case of heavy goods vehicles, is generally significantly greater than the requisite drive power.

Consequently, it is now customary, either to limit power for the charging of the accumulator during braking or downhill travel, such that the charging power is not so high that it results in damage to the accumulator, or to provide an accumulator with an energy storage capacity which, relative to the normal drive, is over-dimensioned, such that power generated during braking or downhill travel can be employed, with no limitation of the service charging capacity of the accumulator. Accordingly, energy generated by braking or downhill travel, in some cases, is not entirely utilized or, for the full utilization thereof, a comparatively over-expensive accumulator is employed.

SUMMARY

In an embodiment, the present invention provides a system for an electrically-driven vehicle includes at least one first energy store, which is of an accumulator type, and at least one second energy store, of a type which differs from an accumulator type. The second energy store has an energy density lower than an energy density of the first energy store, and has a power density higher than a power density of the first energy store. The first energy store and the second energy store are designed to supply electrical energy for an electric drive of the vehicle.

BRIEF DESCRIPTION OF THE DRAWINGS

The subject matter of the present disclosure will be described in even greater detail below based on the exemplary figures. The present disclosure is not limited to the exemplary embodiments. All features described and/or illustrated herein can be used alone or combined in different combinations in different embodiments. The features and advantages of various embodiments will become apparent by reading the following detailed description with reference to the attached drawings which illustrate the following.

DETAILED DESCRIPTION

Figure 1:
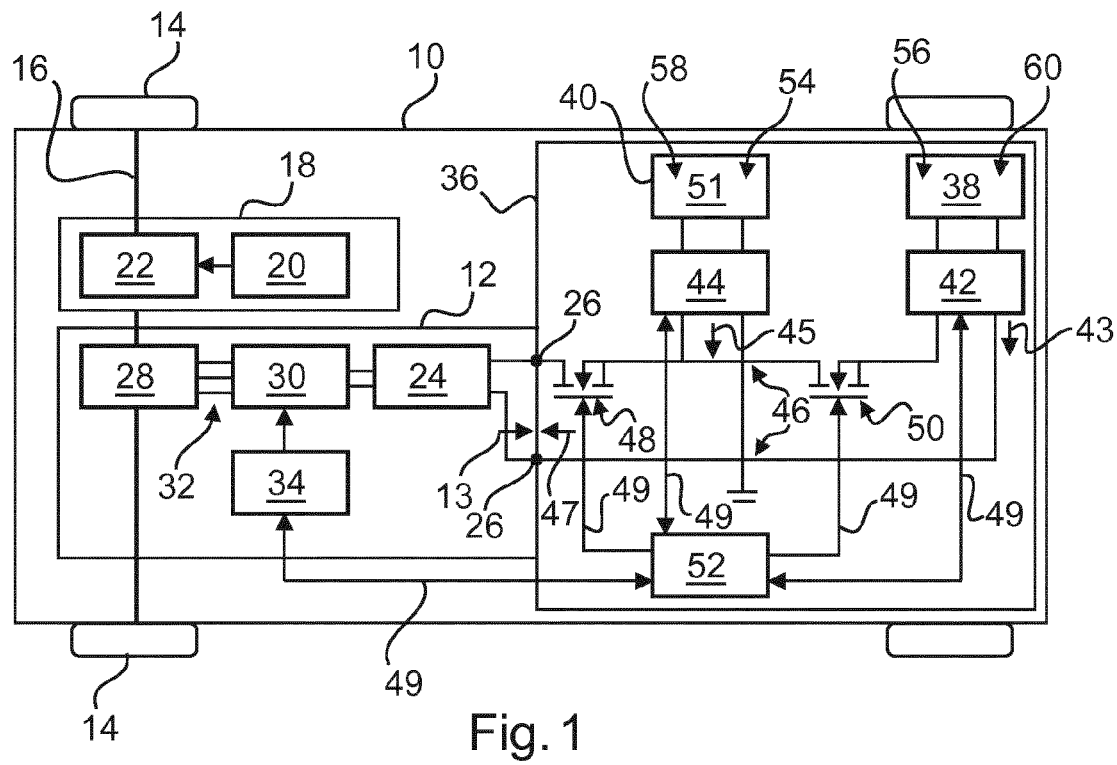
FIG. 1 shows a system according to a first exemplary embodiment, in a utility vehicle according to an exemplary embodiment.

The present disclosure is therefore the identification of an option by means of which, as far as possible, the full amount of energy generated during braking or downhill travel, particularly of a utility vehicle, can be subject to intermediate storage in its entirety, without the necessity for the employment of an expensive and relatively over-dimensioned accumulator for this purpose.

To this end, the present disclosure relates to a system for an electrically-driven vehicle. In particular, the vehicle is a utility vehicle, such as a heavy goods vehicle. Alternatively, the vehicle is a vehicle trailer, for example a semitrailer for a tractor which is configured as a utility vehicle. A further example of the vehicle is a passenger vehicle. The system comprises at least one first energy store and at least one second energy store, which are designed to deliver energy for the supply of an electric drive of the vehicle. The first energy store of the system is of the accumulator type. The first energy store is thus a rechargeable accumulator for storing of electrical energy on an electrochemical basis. The first energy store thus comprises one or more rechargeable storage elements, which are also described as secondary elements or secondary cells. Examples of an accumulator include, for example, a lead-acid accumulator, a lithium-ion accumulator, a lithium-polymer accumulator, or a lithium-iron phosphate accumulator.

The at least one second energy store is of a type which differs from an accumulator type. Consequently, the second energy store is thus a store which is not an accumulator. Moreover, the second energy store has an energy density which is lower than the energy density of the first energy store. The second energy store further has a power density which is higher than the power density of the first energy store.

The system thus comprises two different energy store types, wherein one of the store types has a higher power density, but thus a lower energy density than the other energy store.

It is thus possible for one energy store, namely the second energy store, in the event of a slow-down, i.e. upon braking, or in the event of downhill travel, to be employed for charging to a high capacity, and for the energy thus stored to be employed thereafter for the supply of the motor and the charging of the first energy store. To this end, the second energy store has a correspondingly higher power density than the first energy store. This means that the second energy store can be charged to a higher capacity than the first energy store, wherein, for the continuous operation of the electric drive, the first energy store has a higher energy density, such that the latter is designed with a higher energy storage capacity than the second energy store.

A significantly higher power generated in the event of a slow-down or downhill travel can thus be subject to short-term intermediate storage in the second energy store in its entirety, with no limitation of capacity. Additionally, a first energy store can be configured with a lower power density than the second energy store, in order to provide a comparatively cost-effective energy store, the essential function of which is the supply of the electric drive during routine travel.

According to a first form of embodiment of the system, the energy density of the second energy store is less than one half the energy density of the first energy store, and the power density of the second energy store corresponds to at least five times the power density of the first energy store. As a result, preferably in particularly heavy vehicles, such as loaded heavy goods vehicles and/or trailer vehicles thereof having a dedicated electric drive, a particularly high power which is generated by a slow-down or by downhill travel can undergo intermediate storage, in its entirety, in the second energy store.

According to a further form of embodiment, the second energy store is a capacitor, particularly a supercapacitor. A supercapacitor of this type is available as a standardized component, and can thus be employed as an energy store with a high power density which is comparatively cost-effective. Alternatively or additionally, the second energy store is a flywheel, to which an electric motor-generator set and a converter are assigned. By means of the converter and the electric motor-generator set, operating in a motor mode, a flywheel is set in rotary motion by the energy which has been generated by a slow-down or by downhill travel, in order to store said energy. This energy can then be retrieved, wherein the rotation of the flywheel, with the electric motor-generator set operating in a generator mode, by the reverse operation of the converter, is converted into power again for the supply of the electric drive. Energy stores of this type are particularly suitable for the intermediate storage of power, and feature a particularly high power density.

According to a further form of embodiment, the system comprises a DC voltage connection, which is designed to deliver electrical energy to an electric drive from the first energy store and/or the second energy store for the supply of an electric drive. The DC voltage connection is moreover designed to store energy from the at least one electric drive, during operation in a generator mode, in the first and/or second energy store. The DC voltage connection is moreover designed to transmit energy from the second energy store to the first energy store.

The DC voltage connection thus constitutes a connection, which is specifically routed via further electrotechnical components, between the first energy store, the second energy store and an electric drive. Thus, for example, a transmission of energy is possible from one region of a vehicle, in which the system is employable, to another region of the vehicle, such that it is not necessary for the energy stores to be arranged in the immediate vicinity of the electric drive.

According to a further form of embodiment, the system comprises a DC voltage converter, by means of which the second energy store is detachably connected to the DC voltage connection. The DC voltage converter is, for example, a flyback converter, a forward converter or a buck/boost converter. If the DC voltage converter is configured as a buck/boost converter, the latter particularly comprises a half-bridge and a power inductance. The DC voltage converter is designed for detachable connection, such that the latter, for example, particularly if it is configured as a flyback converter or a forward converter, permits a galvanic isolation of the DC voltage converter from the DC voltage connection. In this case, however, the term "detachably connected" does not refer exclusively to galvanic isolation, such that a buck/boost converter, also described as an inverting converter, in an out-of-service mode, also describes an interruption of the connection. In any event, the function of the DC voltage converter is the delivery of an essentially constant voltage on the DC voltage connection by means of the second energy store, in the event that the second energy store is configured as a capacitor or a supercapacitor. This is based upon the knowledge that a capacitor assumes a terminal voltage which is proportional to the energy stored in the capacitor. Upon the discharging or charging of the second energy store, there is a corresponding variation in the voltage which is delivered directly on the output of a second energy store, which is compensated by the DC voltage converter.

According to a further form of embodiment, the electric drive comprises an intermediate DC voltage circuit, at least one inverter, at least one electric motor and at least one motor controller for the actuation of the at least one inverter. The intermediate DC voltage circuit is connectable to the DC voltage connection, in order to compensate and/or smooth voltage fluctuations on the DC voltage connection. The inverter is configured, from the power delivered to the intermediate DC voltage circuit, to deliver power for the at least one electric motor. The inverter is actuated by the motor controller, in order to generate a desired electric motor torque. The motor controller is further employed for the actuation of the inverter in a reverse direction, in order to connect the electric motor, which is operated in a generator mode, to the DC voltage connection via the intermediate DC voltage circuit, such that energy which is generated in the electric motor operating in a generator mode can be stored as energy in the first energy store and/or in the second energy store.

According to a further form of embodiment, the system comprises an energy management circuit, which is designed to control or regulate power and/or energy which is exchanged between the DC voltage connection and the first energy store, and between the DC voltage connection and the second energy store. To this end, the energy management circuit is preferably designed to control the DC voltage converter, and to control an accumulator management circuit of the first energy store.

Accordingly, a central element, namely the energy management circuit, is provided as a superordinate authority for the control, organization and regulation of energy and power within the system.

According to a further form of embodiment, a first switch is provided, which is preferably a semiconductor switch. The function of the first switch is the interruptible connection of the first and second energy stores to the electric drive. The energy management circuit is moreover designed to actuate the first switch. By means of the first switch, disconnection of the electric drive from the first energy store and the second energy store, i.e. from the energy supply, is possible. This is of particular use in the event that, additionally, a combustion engine is present in a vehicle having the system, and an acceleration is executed exclusively by means of the combustion engine, when the electric drive is not required in a transitional period. During this transitional period, energy can be charged from the second energy store to the first energy store via the DC voltage connection such that, insofar as possible, the full capacity of the second energy store is available in the event of a subsequent slow-down or downhill travel.

According to a further form of embodiment, the system comprises a second switch, which is also preferably a semiconductor switch. The function of the second switch is the interruptible connection of the first energy store to the DC voltage connection. The energy management circuit is moreover designed to actuate the second switch. As a result—provided that the first energy store is essentially fully charged—energy can be exchanged with the electric drive exclusively by the charging and discharging of the second energy store, with no necessity for the actuation of the first energy store, particularly by means of its accumulator management circuit.

According to a further form of embodiment, the energy management circuit is designed to be operated in a first mode. In the first mode, the first switch and the second switch are closed, in order to store electrical energy, which is generated by the electric drive, in the first energy store and/or the second energy store. Alternatively, both switches are closed, in order to employ energy from the first energy store and/or the second energy store for the supply of the electric drive. The energy management circuit is preferably designed to switch over to the first mode, if a charge of the first energy store lies below a predefined first threshold value. Accordingly, a mode other than the first mode is then preferably employed, provided that the charge of the first energy store lies on or above the predefined first threshold value.

The circumstance is thus exploited whereby energy generated by the drive is only employed for the recharging of the first energy store if sufficient energy storage capacity is available in the latter. By the actuation of the accumulator management circuit, the energy management circuit preferably limits the charging capacity of the first energy store, such that the latter is not destroyed.

According to a further form of embodiment, the energy management circuit is designed, in the event that the second energy store assumes a charge in excess of a second predefined threshold value, to limit the power delivered by the electric drive. In this case, namely wherein the second energy store already assumes a charge which exceeds a second threshold value, which is preferably selected to represent an essentially full charge of the second energy store, electric power which is supplied by the drive is limited accordingly. It is thus ensured that the first energy store, which is still capable of being charged, is not charged to a capacity which damages the latter.

Protection of the first energy store in the event of an essentially fully-charged second energy store is ensured accordingly.

According to a further form of embodiment, the energy management circuit is designed to be operated in a second mode, in which the first switch is closed and the second switch is open. In this mode, the system is designed only to store energy which is delivered by the electric drive in the second energy store, or to only employ energy from the second energy store for the supply of the electric motor. The energy management circuit is designed to switch over to the second mode, particularly if a charge of the first energy store exceeds the predefined first threshold value. Accordingly, if the first energy store is essentially fully-charged, or is fully charged, said first energy store, for the protection of the DC voltage connection, is disconnected by the opening of the second switch. An energy exchange is then only possible between the drive and the second energy store.

According to a further form of embodiment, the energy management circuit is designed to be operated in a third mode. In the third mode, the first switch is open and the second switch is closed, in order to charge the first energy store with energy from the second energy store. This case will occur where a vehicle with the system, for example having no electric drive, is driven by a combustion engine only, wherein the system is employed for the transfer of charge from the second energy store to the first energy store, such that the availability of the full capacity of the second energy store, for a further braking process or for downhill travel, is restored.

According to a further form of embodiment, the present disclosure provides a vehicle, particularly a utility vehicle, a vehicle trailer or similar, which incorporates a system according to one of the above-mentioned forms of embodiment. The present disclosure further provides a method for operating a system according to one of the above-mentioned forms of embodiment, or a vehicle having the system according to one of the above-mentioned forms of embodiment.

FIG. 1 shows a vehicle 10, which is a utility vehicle. The vehicle 10 comprises an electric drive 12, by means of which wheels 14 on a drive axle 16 are drivable. The drive axle 16 is moreover drivable by a combustion engine drive 18. The combustion engine drive 18 represented here comprises an engine controller 20 and a combustion engine 22 for actuating the drive axle 16. The electric drive 12 comprises an intermediate DC voltage circuit 24, via which electrical energy for the electric drive 12 can be delivered to the input 26. The function of the intermediate DC voltage circuit 24 is the smoothing and intermediate storage of electrical energy. The electric drive 12 further comprises an electric motor 28, which can be supplied with energy from the intermediate DC voltage circuit, which is converted into an AC voltage 32 by means of an inverter 30. The inverter 30 is actuated by means of a motor control device 34, in accordance with a desired torque of the electric motor 28. The electric motor 28 can also be operated in a generator mode for the braking of the drive axle 16, wherein energy from the electric motor 28 is then injected via the inverter 30 into the intermediate DC voltage circuit 24, which can then be delivered as an output via the terminal 26 of the electric drive 12.

For the supply of the electric drive 12 with energy 13, or for the storage of energy 13 delivered by the electric drive 12, the vehicle comprises a system 36. The system 36 comprises a first energy store 38 and a second energy store 40. The first energy store 38 is connected via an accumulator management circuit 42, and the second energy store 40 via a DC voltage converter 44 to a DC voltage connection 46. The function of the DC voltage connection 46 is the connection of the first energy store 38 and the second energy store 40 to the electric drive 12. Electrical energy 47 for the electric drive 12 is thus delivered from the first energy store 38 and the second energy store 40 via the DC voltage connection 46. Electrical energy 43 from the first energy store 38, and electrical energy 45 from the second energy store 40 is thus available.

The DC voltage connection 46 comprises a first switch 48 and a second switch 50. Additionally, an energy management circuit 52 is provided, which controls the first switch 48, the second switch 50, the motor control device 34, the DC voltage converter 44 and the accumulator management circuit 42, via control lines 49. The second energy store 40 assumes an energy density 54 which is lower than an energy density 56 of the first energy store 38. The second energy store 40 moreover assumes a power density 58 which is higher than a power density 60 of the first energy store 38. The first energy store 38 is an accumulator and the second energy store 40 is a supercapacitor 51.

Figure 2:
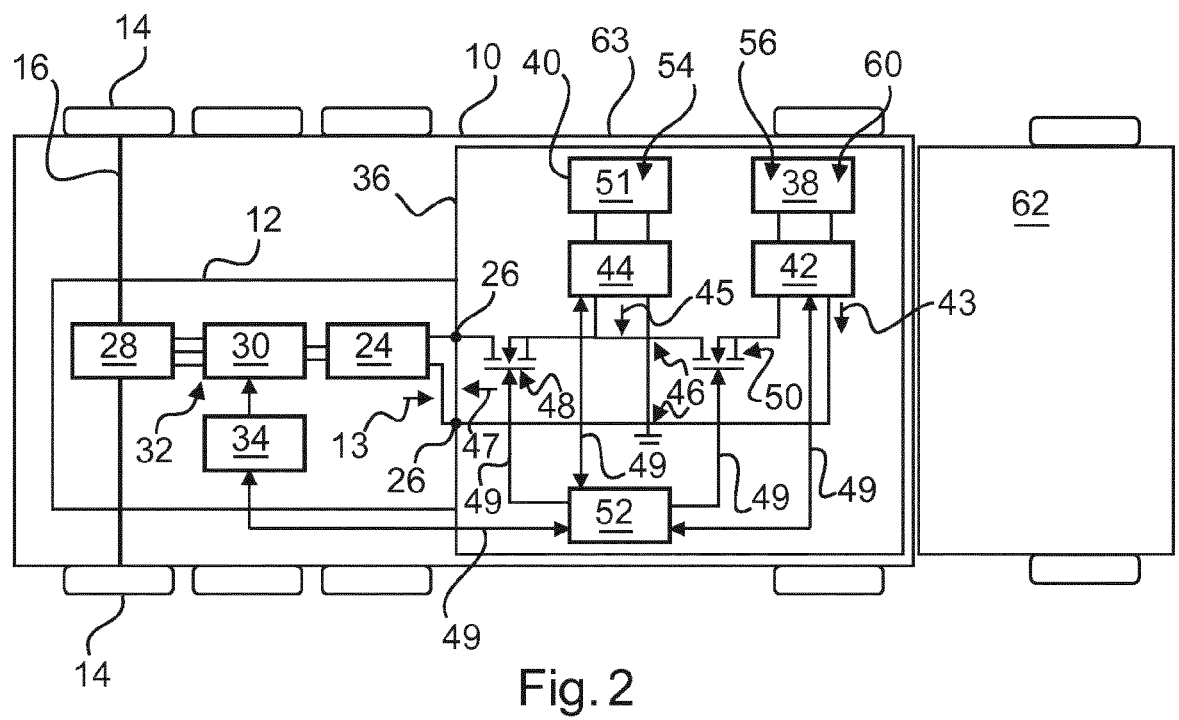
FIG. 2 shows a truck and trailer combination having the system.

FIG. 2 shows a further vehicle 10, which is a vehicle trailer 63. The vehicle trailer is towed by an exemplarily represented tractor vehicle 62. The vehicle 10 in FIG. 2 comprises the same components as the vehicle 10 in FIG. 1, wherein the vehicle 10 in FIG. 2 comprises no combustion engine drive 18. Accordingly, the same reference numbers identify the same features.

Figure 3:
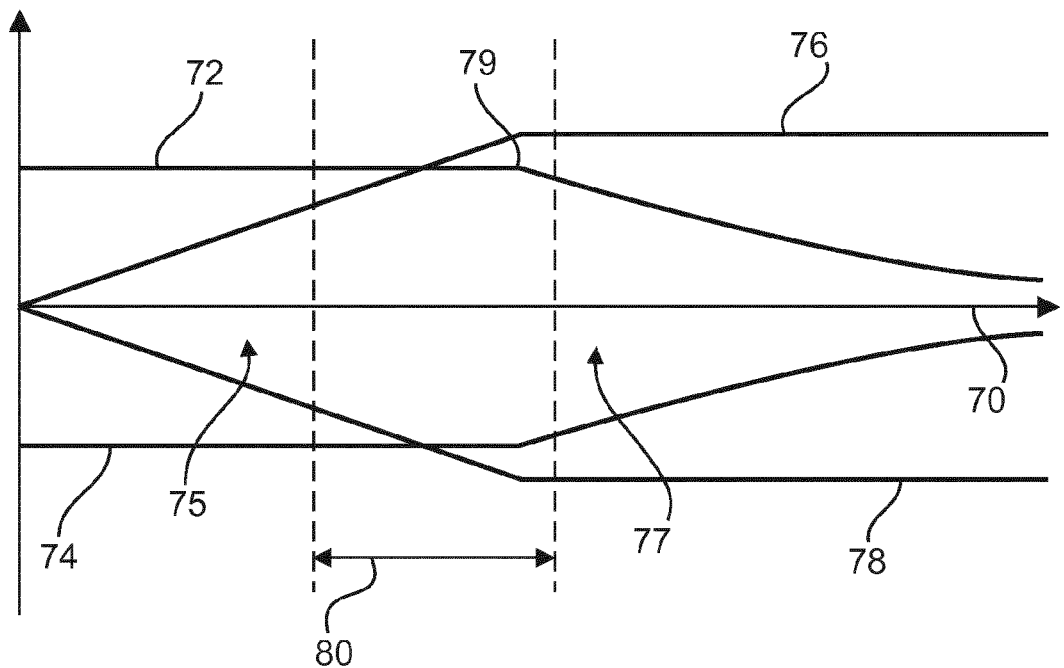
FIG. 3 shows the speed-dependent torques of electric motors.

FIG. 3 shows the torque of an electric drive 12, which can be delivered according to a vehicle speed. To this end, the vehicle speed is plotted on the axis 70. The torque of the electric drive 12 during positive acceleration is represented on the curve 72 and, up to the "transition speed" 79, is essentially constant. The same applies to a negative torque 74 which, in the event of braking, is delivered by the electric drive 12 in a generator operating mode, and is represented by the curve 74. Depending upon the torque, correspondingly, the energy required by the electric drive 12 for acceleration is represented by the curve 76, and the energy delivered by the electric drive 12 in a generator operating mode is represented by the curve 78. It will be seen that an electric drive 12 assumes its maximum efficiency in a region 80. This, for example, is a region which, in utility vehicles, is essentially selected between 40 km/h 75 and 80 km/h 77.

Figure 4:
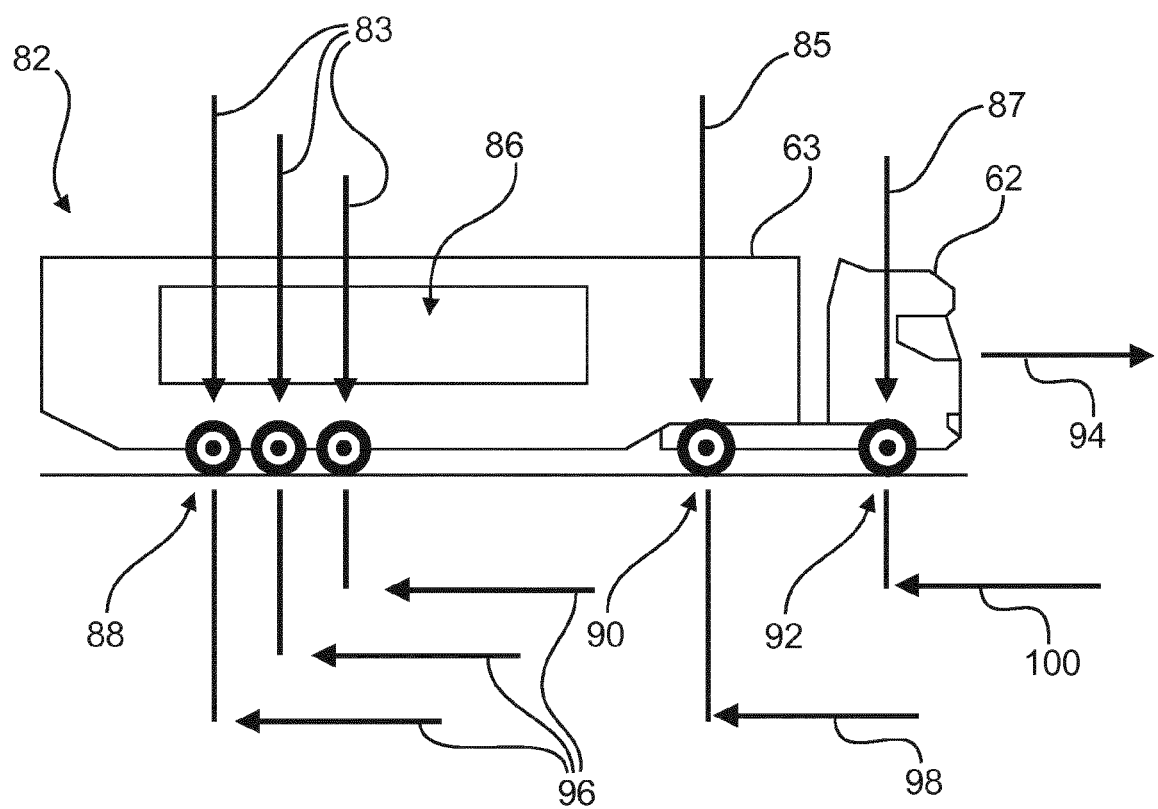
FIG. 4 shows a representation of energy values generated during braking.

FIG. 4 shows exemplary energy values, which are typically generated during the braking of an articulated truck 82. For exemplary purposes, the tractor vehicle 62 has a weight of 8 tonnes, and the trailer vehicle 63 has an unladen weight of 7 tonnes, wherein a load 86 of 20 tonnes has been loaded therein. A distribution of forces acting on the axles is such that 64 kilonewtons 83 act on each of the three axles 88 of the trailer vehicle 63, 75 kilonewtons 85 act on the drive axle 90 of the tractor vehicle 62, and 55 kilonewtons 87 act on the front axle 92. Assuming a variation in acceleration of one meter per second, at a total weight of 35 tonnes, the resulting force 94 is 35 kilonewtons. In the event of braking with a negative acceleration of one meter per second, this is distributed such that 7 kilonewtons 96 act on each of the axles 88 of the trailer vehicle 63, 8 kilonewtons 98 act on the drive axle 90 of the tractor vehicle 62, and 6 kilonewtons 100 act on the front axle 92 of the tractor vehicle 62. At a speed of 80 km/h, in this case, the resulting power is 775 kilowatts, corresponding to an energy, during a braking maneuver from 85 km/h to 70 km/h, of the order of 3,250 kilowatt-seconds. If, for example, a generator drive is employed on only one axle of the vehicle trailer 86, approximately 465 kilowatts and, during the above-mentioned braking from 85 km/h to 70 km/h, 1,300 kilowatt-seconds can thus be recovered. In the case of a tractor vehicle 62 which is braked by an electric drive 12, approximately 1,950 kilowatt-seconds can be recovered from braking.

Figure 5:
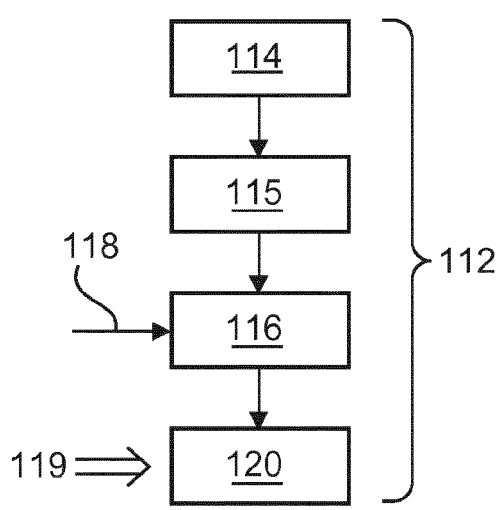
FIG. 5 shows a method according to a first exemplary embodiment of the invention.

FIG. 5 shows an exemplary embodiment of the method. FIG. 5 shows a first mode 112 of the energy management circuit 52. In the first mode 112, in one step 114, the first switch 48 and the second switch 50 are closed. In one step 115, the first energy store 38 and the second energy store 40 are then employed for the supply of the electric drive 12, or energy which is generated by means of the electric drive 12 is stored in the energy stores 38, 40. If, in a step 116, a charge of the second energy store 40 in excess of a second threshold value 118 is detected, in a step 120, in which the electric drive 12 operates in a generator mode 119, power delivered by the electric drive 12 is limited accordingly.

Figure 6:
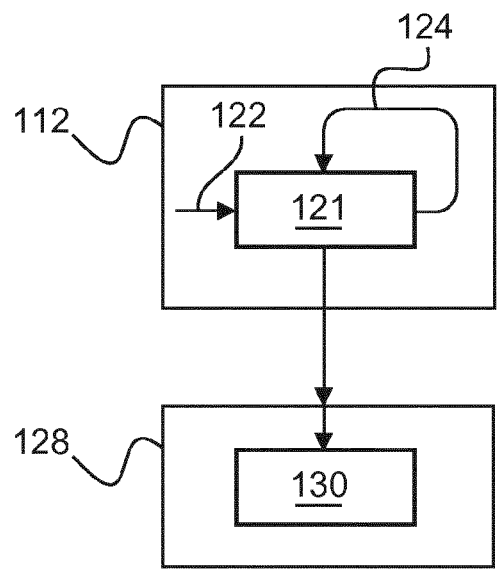
FIG. 6 shows a first mode of the system, and the transition to the second mode.

FIG. 6 shows a further step 121 in the first mode 112. In this case, in the first mode 112, additionally, in step 121, a charge of the first energy store 38 is compared with a first threshold value 122. If the charge lies below the predefined first threshold value 122, 124, the energy management circuit 52 remains in the first mode 112. If the first threshold value 122 is exceeded by the charge of the first energy store 38, 126, the energy management circuit 52 switches over to a second mode 128 in which, in one step 130, the second switch 50 is opened. Electrical energy which is delivered by the electric drive 12 is thus only stored in the second energy store 40, or energy from the second energy store 40 is employed for the supply of the electric drive 12.

Figure 7:
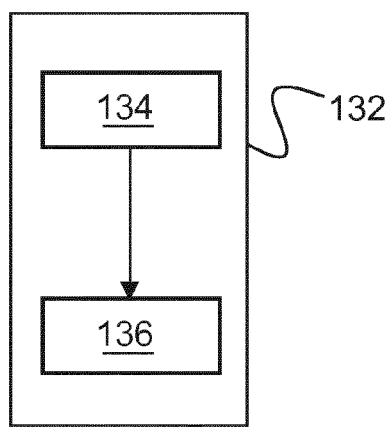
FIG. 7 shows a third mode.

FIG. 7 shows a third mode 132 in which, in one step 134, the first switch 48 is opened and the second switch 50 is closed. In this mode 132, in a step 136, energy is then charged from the second energy store 40 to the first energy store 38.

Figure 8:
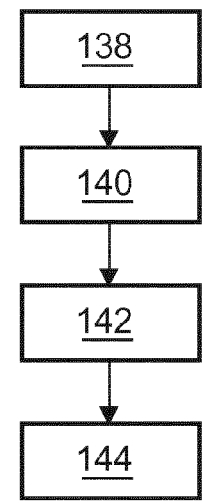
FIG. 8 shows a further exemplary embodiment of the method.

FIG. 8 shows the steps of an exemplary embodiment of the method. In step 138, energy is generated by means of an electric drive 12 and, in step 140, is stored in the second store 40. Thereafter, in a step 142, a vehicle 10 having the system 36 is accelerated by means of a combustion engine drive 18 and, in a step 144, energy is charged from the second energy store 40 to the first energy store 38.

Figure 9:
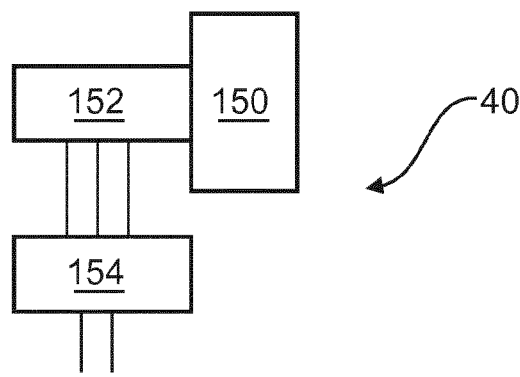
FIG. 9 shows a second energy store.

FIG. 9 shows an alternative exemplary embodiment of a second energy store 40, which is configured as a supercapacitor 51. In FIG. 9, accordingly, a second energy store 40 is represented which comprises a flywheel 150, to which an electric motor-generator set 152 is connected, in order to store kinetic energy generated from electrical energy in the flywheel 150 or, in a generator operating mode, to retrieve electrical energy from the kinetic energy stored in the flywheel 150. To this end, the electric-motor generator set 152 is provided with a converter 154, in order to convert an AC voltage 32 of the motor into a DC voltage for the DC voltage connection 46, or vice versa.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

10 Vehicle
12 Electric drive
13 Energy supplied by the electric drive
14 Wheels
16 Drive axle
18 Combustion engine drive
20 Motor controller
22 Combustion engine
24 Intermediate DC voltage circuit
26 Input
28 Electric motor
30 Inverter
32 AC voltage
34 Motor control device
36 System
38 First energy store
40 Second energy store
42 Accumulator management circuit
43 Energy supplied by the first energy store
44 DC voltage converter
45 Energy supplied by the second energy store
46 DC voltage connection
47 Electrical energy supplied
48 First switch
49 Control lines
50 Second switch
51 Supercapacitor
52 Energy management circuit
54 Energy density of the second energy store
56 Energy density of the first energy store
58 Power density of the second energy store
60 Power density of the first energy store
62 Tractor vehicle
63 Trailer vehicle
70 Axis of vehicle speed
72 Torque curve of electric drive
74 Negative torque
75 40 km/h
76 Curve of energy required for acceleration
77 80 km/h
78 Curve of energy delivered during braking
79 Transition speed
80 Region
82 Articulated truck
83 64 kN
85 75 kN
86 Load
87 55 kN
88 Axles of trailer vehicle
90 Drive axle of tractor vehicle
92 Front axle
94 Force
96 kN acting on the axles
98 kN acting on the drive axle
100 kN acting on the front axle
112 First mode of the energy management circuit
114-116 Steps of the method
118 Second threshold value
119 Generator operating mode
120-121 Steps of the method
122 First threshold value
124 Charge below the first threshold value
126 Charge exceeding the first threshold value
128 Second mode of the energy management circuit
130 Step of the method
132 Third mode of the energy management circuit
134-144 Steps of the method
150 Flywheel
152 Electric motor-generator set
154 Converter

The invention claimed is:

1. A system for an electrically-driven vehicle, comprising:
at least one first energy store, which is of an accumulator type, and
at least one second energy store, of a type which differs from an accumulator type,
wherein the second energy store has an energy density lower than an energy density of the first energy store, and has a power density higher than a power density of the first energy store,
wherein the first energy store and the second energy store are designed to supply electrical energy for an electric drive of the vehicle, and
wherein the second energy store comprises a flywheel having an electric motor-generator set which is assigned to the flywheel and a converter which is assigned to the flywheel,
wherein the energy density of the second energy store is less than one half the energy density of the first energy store, and the power density of the second energy store corresponds to at least five times the power density of the first energy store.

2. The system as claimed in claim 1, where the second energy store further comprises a capacitor.

3. The system as claimed in claim 1, wherein the system comprises a DC voltage connection, which is designed to deliver electrical energy from the first energy store and/or electrical energy from the second energy store for the supply of the electric drive, and the DC voltage connection is designed to store energy from the electric drive, during operation in a generator mode, in the first energy store and/or the second energy store, and the DC voltage connection is designed to transmit energy from the second energy store to the first energy store.

4. The system as claimed in claim 1, wherein the system comprises a DC voltage converter, by which the second energy store is detachably connected to the DC voltage connection, wherein the DC voltage converter is a flyback converter, a forward converter or a buck/boost converter.

5. The system as claimed in claim 1, wherein the electric drive comprises at least one electric motor, at least one inverter and at least one motor control device for actuating the inverter, and also comprises an intermediate DC voltage circuit.

6. The system as claimed in claim 1, wherein the system comprises an energy management circuit, which is designed to control or regulate energy which is exchangeable between the DC voltage connection and the first energy store, between the DC voltage connection and the second energy store, and between the intermediate DC voltage circuit and the DC voltage connection, wherein, to this end, the energy management circuit is designed to communicate with the motor control device, with the DC voltage converter, and with an accumulator management circuit of the first energy store.

7. The system as claimed in claim 1, wherein the system comprises a first switch, particularly a semiconductor switch, by means of which the first energy store and the second energy store are detachably connected to the electric drive, and the energy management circuit is designed to actuate the first switch.

8. The system as claimed in claim 7, wherein the energy management circuit is designed to be operated in a first mode, in which the first switch and the second switch are closed, such that electrical energy which is generated by the electric drive is stored in the first energy store and/or in the second energy store, and energy from the first energy store and/or energy from the second energy store is employed for the supply of the electric drive, wherein the energy management circuit is particularly designed to switch over to the first mode if a charge of the first energy store lies below a predefined first threshold value.

9. The system as claimed in claim 8, wherein, in the event that the second energy store has a charge which exceeds a second threshold value, the energy management circuit is designed to limit energy which is delivered by the electric drive.

10. The system as claimed in claim 7, wherein the energy management circuit is designed to be operated in a second mode, in which the first switch is closed and the second switch is opened, such that electrical energy which is supplied by the electric drive is stored in the second energy store, or energy from the second energy store is employed for the supply of the electric drive, wherein the energy management circuit is particularly designed to switch over to the second mode, if a charge of the first energy store exceeds the predefined first threshold value.

11. The system as claimed in claim 7, wherein the energy management circuit is designed to be operated in a third mode, in which the first switch is opened and the second switch is closed, such that energy is charged from the second energy store to the first energy store.

12. The system as claimed in claim 1, wherein the system comprises a second switch, particularly a semiconductor switch, by means of which the first energy store is detachably connected to the DC voltage connection, wherein the energy management circuit is designed to actuate the second switch.

13. A vehicle, comprising a system as claimed in claim 1.

14. A method for operating a system as claimed in claim 1, the method comprising:
 generation of energy by an electric drive,
 storage of the generated energy in the second energy store, and
 charging of energy from the second energy store to the first energy store.

* * * * *